US012541852B2

United States Patent
Hsiao et al.

(10) Patent No.: US 12,541,852 B2
(45) Date of Patent: Feb. 3, 2026

(54) DEEP LEARNING VOLUMETRIC DEFORMABLE REGISTRATION

(71) Applicant: THE REGENTS OF THE UNIVERSITY OF CALIFORNIA, Oakland, CA (US)

(72) Inventors: Albert Hsiao, San Diego, CA (US); Kyle Hasenstab, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 325 days.

(21) Appl. No.: 18/100,525

(22) Filed: Jan. 23, 2023

(65) Prior Publication Data

US 2023/0237661 A1     Jul. 27, 2023

Related U.S. Application Data

(60) Provisional application No. 63/301,975, filed on Jan. 21, 2022.

(51) Int. Cl.
*G06T 7/00* (2017.01)
*G06T 7/30* (2017.01)
(Continued)

(52) U.S. Cl.
CPC .............. *G06T 7/0016* (2013.01); *G06T 7/30* (2017.01); *G06V 10/754* (2022.01); *G06V 10/82* (2022.01);
(Continued)

(58) Field of Classification Search
CPC .............. G06T 7/0016; G06T 7/30; G06T 2207/20081; G06T 2207/20084;
(Continued)

(56) References Cited

U.S. PATENT DOCUMENTS 9,513,357 B2   12/2016   Hsiao et al.
10,909,681 B2   2/2021   Hsiao et al.
(Continued)

OTHER PUBLICATIONS

B. C. Lee et al., "Breathing-Compensated Neural Networks for Real Time C-Arm Pose Estimation in Lung CT-Fluoroscopy Registration," 2022 IEEE 19th International Symposium on Biomedical Imaging (ISBI), Kolkata, India, 2022, pp. 1-5. (Year: 2022).*

(Continued)

*Primary Examiner* — Kathleen Y Dulaney
(74) *Attorney, Agent, or Firm* — Eleanor Musick; Torrey Pines Law Group PC

(57) ABSTRACT

A method and system for automated deformable registration of an organ from medical images includes generating segmentations of the organ by processing a first and second series of images corresponding to different organ states using a first trained CNN. A second trained CNN processes the first and second series of images and the segmentations to deformably register the second series of images to the first series of images. The second trained CNN predicts a displacement field by minimizing a registration loss function, where the displacement field maximizes colocalization of the organ between the different states.

14 Claims, 10 Drawing Sheets
(3 of 10 Drawing Sheet(s) Filed in Color)

(51) Int. Cl.
*G06V 10/75* (2022.01)
*G06V 10/82* (2022.01)

(52) U.S. Cl.
CPC .............. *G06T 2207/20081* (2013.01); *G06T 2207/20084* (2013.01); *G06T 2207/30061* (2013.01); *G06V 2201/031* (2022.01)

(58) Field of Classification Search
CPC . G06T 2207/30061; G06T 2207/10076; G06T 7/38; G06V 10/754; G06V 10/82; G06V 2201/031; G06N 3/0985; G06N 3/045; G06N 3/0464; G06N 3/08
USPC .......................... 382/128, 156, 276; 600/529
See application file for complete search history.

(56) References Cited

U.S. PATENT DOCUMENTS

| | | | |
|---|---|---|---|
| 2018/0070905 A1* | 3/2018 | El-Baz | G06T 7/149 |
| 2018/0259608 A1* | 9/2018 | Golden | G06N 3/084 |
| 2019/0030371 A1* | 1/2019 | Han | A61N 5/1039 |
| 2020/0178845 A1* | 6/2020 | Castillo | A61B 5/004 |
| 2021/0118205 A1* | 4/2021 | Huang | G01R 33/5608 |
| 2021/0209775 A1* | 7/2021 | Song | G06T 7/38 |
| 2021/0350549 A1* | 11/2021 | Lu | G06V 10/82 |
| 2022/0114699 A1 | 4/2022 | Hsiao et al. | |
| 2022/0167856 A1* | 6/2022 | Odame | G06N 3/09 |
| 2022/0261991 A1 | 8/2022 | Hsiao et al. | |
| 2023/0076809 A1* | 3/2023 | Chaudhary | A61B 6/5217 |

OTHER PUBLICATIONS

S. E. Gerard, J. M. Reinhardt, G. E. Christensen and R. S. J. Estepar, "Estimating Local Tissue Expansion in Thoracic Computed Tomography Images Using Convolutional Neural Networks," 2020 IEEE 17th International Symposium on Biomedical Imaging (ISBI), Iowa City, IA, USA, 2020, pp. 1856-1860. (Year: 2020).*

Z. Zhu, Y. Ji and Y. Wei, "Lung CT image registration based on end-to-end unsupervised learning," 2021 6th International Conference on Communication, Image and Signal Processing (CCISP), Chengdu, China, 2021, pp. 90-95. (Year: 2021).*

R. Hu, H. Wang, T. Ristaniemi, W. Zhu and X. Sun, "Lung CT Image Registration through Landmark-constrained Learning with Convolutional Neural Network," 2020 42nd Annual International Conference of the IEEE Engineering in Medicine & Biology Society (EMBC), Montreal, QC, Canada, 2020, pp. 1368-1371. (Year: 2020).*

P. Xue, Y. Fu, H. Ji, W. Cui and E. Dong, "Lung Respiratory Motion Estimation Based on Fast Kalman Filtering and 4D CT Image Registration," in IEEE Journal of Biomedical and Health Informatics, vol. 25, No. 6, pp. 2007-2017, Jun. 2021. (Year: 2021).*

K. A. J. Eppenhof, M. W. Lafarge, M. Veta and J. P. W. Pluim, "Progressively Trained Convolutional Neural Networks for Deformable Image Registration," in IEEE Transactions on Medical Imaging, vol. 39, No. 5, pp. 1594-1604, May 2020. (Year: 2020).*

K. A. J. Eppenhof and J. P. W. Pluim, "Pulmonary CT Registration Through Supervised Learning With Convolutional Neural Networks," in IEEE Transactions on Medical Imaging, vol. 38, No. 5, pp. 1097-1105, May 2019. (Year: 2019).*

D. Mahapatra and Z. Ge, "Training Data Independent Image Registration with Gans Using Transfer Learning and Segmentation Information," 2019 IEEE 16th International Symposium on Biomedical Imaging (ISBI 2019), Venice, Italy, 2019, pp. 709-713. (Year: 2019).*

L. Zhou, X. Xu, K. Zhou and J. Guo, "LTS-NET: Lung Tissue Segmentation from CT Images using Fully Convolutional Neural Network," 2021 11th International Conference on Information Science and Technology (ICIST), Chengdu, China, 2021, pp. 125-131. (Year: 2021).*

Chen, X., et al., Deep Learning In Medical Image Registration, Prog. Biomed. Eng. 3, 2021, pp. 1-28.

Hasenstab, K., et al., Automated CT Staging of Chronic Obstructive Pulmonary Disease Severity for Predicting Disease Progression and Mortality with a Deep Learning Convolutional Neural Network, Radiology: Cardiothoracic Imaging, 2021, pp. 1-12, vol. 3.

Hasenstab, K., et al., CNN-based Deformable Registration Facilitates Fast and Accurate Air Trapping Measurements at Inspiratory and Expiratory CT, Radiology: Artificial Intelligence, 2022, pp. 1-12, vol. 4.

Ruhaak, J., et al., Estimation of Large Motion in Lung CT by Integrating Regularized Keypoint Correspondences into Dense Deformable Registration, IEEE Transactions on Medical Imaging, Aug. 2017, pp. 1746-1757, vol. 36.

* cited by examiner

DEEP LEARNING VOLUMETRIC DEFORMABLE REGISTRATION

RELATED APPLICATIONS

This application claims the benefit of the priority of Provisional Application No. 63/301,975, filed Jan. 21, 2022, which is incorporated herein by reference in its entirety.

FIELD OF THE INVENTION

The present invention relates to a convolutional neural network (CNN)-based deformable registration algorithm to reduce computation time for analysis of medical images such as CT and MRI.

BACKGROUND

Image registration is the process of identifying a spatial transformation that maps two (pair-wise registration) or more (group-wise registration) images to a common coordinate frame so that corresponding anatomical structures are optimally aligned. In other words, a voxel-wise "correspondence" needs to be established between the images. Automated co-registration is an essential feature of nearly all medical imaging applications, however, co-registration can be computationally expensive and particularly challenging for imaging of deformable organs, an extreme example of which is the lungs. The registration of inspirative and expirative lung CT images has important medical applications in the diagnosis and characterization of small airway disease and emphysema. Using accurate pulmonary registration, the local lung ventilation can be reliably quantified. Lung registration is also widely used in radiotherapy for estimation of tumor motion together with localized ventilation measures, which can be included into planning to spare as much well-functioning tissue as possible from radiation dose.

Diseases affecting the small airways, such as chronic obstructive pulmonary disease (COPD), bronchiolitis obliterans related to stem cell transplantation or chronic lung allograft dysfunction, and cystic fibrosis, can manifest as pulmonary air trapping, which can go undetected on routine inspiratory chest CT. For each of these diseases, chronic inflammation and obstruction of the small airways limit the rate and volume of gas expulsion during expiratory phase, which is typically diagnosed via pulmonary function testing (PFT) through measurement of FEV1 and FEV1/FVC. Although air trapping may sometimes be observed as mosaic attenuation on expiratory phase CT, evidence has shown that diffuse air trapping can be difficult to detect visually. In contrast, quantitative measurements on a dedicated inspiratory/expiratory lung CT protocol can facilitate air trapping assessment, which has been shown to prognosticate both disease progression and mortality.

Several methods for quantifying air trapping have been proposed. Early methods approximated air trapping by measuring low attenuation areas (LAA) on expiratory phase CT images, however, these measurements can be confounded by areas of emphysema. Other methods quantify air trapping by registering inspiratory and expiratory phase images using lung deformable registration, enabling regional discrimination of areas where gas exchange is impaired by air trapping from areas that are emphysematous. These iterative deformable registration algorithms incorporate diffeomorphic constraints to enforce transformation invertibility (i.e., limit voxel "folding") and improve registration accuracy, but require a significant amount of time, from minutes to hours, to complete, increasing computational cost and limiting feasibility for use in routine clinical care.

Recently, deep convolutional neural networks (CNN) algorithms have shown promise for performing deformable registration in a variety of organs, each with the potential to reduce computational time, while preserving accuracy. With the advent of deep learning (DL), there have been significant advances in algorithmic performance for various computer vision tasks, including medical image registration. Several CNN architectures have been proposed in recent years, each employing specific architectural modifications to address the issue of vanishing/exploding gradients that are common to deep networks, such as AlexNet, VGG, ResNet, and DenseNet. Among these, in medical image segmentation and registration, the most widely used architecture is the U-Net—an encoder-decoder style network with skip connections between the encoding and decoding paths. The encoder contains several convolutional layers and pooling layers, which downsample the input image to a low resolution. The decoder includes deconvolution layers with a matching number of layers to the encoder. Through the decoder, the feature maps are reconstructed to the original size of the input images. The U-Net utilizes several down- and up-sampling layers to learn features at different resolutions, at the limited expense of computational resources. It has been widely applied in various medical imaging applications, including segmentation. The approach of the present invention seeks to exploit the benefits of such CNN architectures to address the challenges of accurately assessing pulmonary air trapping.

SUMMARY

A CNN-based deformable registration algorithm performs automated co-registration of organs. Application of the algorithm to an input of lung CT image data provides accurate quantification of air trapping measurements in a broad cohort of patients with a wide range of pulmonary air trapping. The inventive approach reduces inference runtime, improves lobar overlap, and reduces voxel "folding." These fast, fully-automated CNN-based lung deformable registration algorithms can facilitate translation of measurements into clinical practice, potentially improving the diagnosis and severity assessment of small airway diseases.

In the disclosed embodiments, the inventive approach employs a CNN-based algorithm to perform deformable lung registration using CT image data. Accuracy of the approach is enhanced by incorporating mathematical constraints to ensure applicability for lobar air trapping quantification. Included among the constraints are one or more of: (a) lobar segmentations to preserve anatomic boundaries, (b) displacement field regularization to encourage physically realistic transformations, and (c) the Jacobian determinant to limit nonanatomic voxel "folding." For deformable registration of chest CT, the inventive CNN-based algorithm achieves greater lobar overlap, and faster runtime (418×) than an iterative reference method.

In one aspect of the invention, a method for automated deformable registration of an organ from medical images includes: receiving in a computer processor configured for executing a trained convolutional neural network (CNN) image data corresponding to a first series of images of the organ in a first state and a second series of images of the organ in at least one second state; propagating the first and second series of images using a first trained CNN to generate segmentations of the organ; propagating the first and second series of images and the segmentations of the organ using a second trained CNN to deformably register the second series of images to the first series of images, wherein the second trained CNN is trained to predict a displacement field by minimizing a registration loss function, wherein the displacement field is configured to maximize colocalization of the organ between the first state and the at least one second state; and generating an output comprising a deformed image corresponding to the at least one second state. The registration loss function may be a combination of one or more loss function selected from the group consisting of cross-correlation loss, displacement field loss, Dice loss, and Jacobian loss. In some embodiments, the image data comprises voxels and the first and second trained CNNs are 3D U-Net CNNs. The organ may be one or more lung, where the first state is inspiratory and the second state is expiratory, and the image data comprises a volumetric lung CT scan. The method may further include extracting lung measurements from the segmentations and/or generating a disease map from a visual comparison of the first series of images and the deformed image. The image data may be pre-processed by one or more of resizing to a standard resolution, scaling voxel attenuations, and affine-registering the second series to the first series.

In another aspect of the invention, a system for automated deformable registration of an organ from medical images includes at least one computer processor configured to:
acquire image data corresponding to a first series of images of the organ in a first state and a second series of images of the organ in at least one second state; execute a first convolutional neural network (CNN), wherein the first CNN trained to generate segmentations of the organ using the first and second series of images; execute a second CNN, wherein the second CNN is trained to deformably register the second series of images to the first series of images using the first and second series of images and the segmentations of the organ, wherein the second CNN is further configured to predict a displacement field by minimizing a registration loss function, wherein the displacement field is configured to maximize colocalization of the organ between the first state and the at least one second state; and generate an output comprising a deformed image corresponding to the at least one second state. The registration loss function may be a combination of one or more loss function selected from the group consisting of cross-correlation loss, displacement field loss, Dice loss, and Jacobian loss. In some embodiments, the image data comprises voxels and the first and second trained CNNs are 3D U-Net CNNs. The organ may be one or more lung, where the first state is inspiratory and the second state is expiratory, and the image data comprises a volumetric lung CT scan. The method may further include extracting lung measurements from the segmentations and/or generating a disease map from a visual comparison of the first series of images and the deformed image. The image data may be pre-processed by one or more of resizing to a standard resolution, scaling voxel attenuations, and affine-registering the second series to the first series.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

The examples and embodiments described herein are directed to lung registration based on CT image data. It will be recognized by those in the art that the inventive method and system are applicable to co-registration of other deformable organs and structures within a body, including, but not limited to, the circulatory, digestive, reproductive, and neurological systems. The method and system described herein are similarly not limited to registration of CT images but may also be used in conjunction with other known imaging methods including, but not limited to MRI and ultrasound.

An automated deep leaning-based approach for deformable registration employs a multichannel 3D convolutional neural network (CNN). According to embodiments of the inventive approach disclosed herein, the CNN is a U-Net, a fully convolutional network that is known in the art, its name derived from its u-shaped architecture. (See, O. Ronneberger, et al., "U-Net: Convolutional Networks for Biomedical Image Segmentation", (2015) arXiv: 1505.04597 [cs.CV], incorporated herein by reference). Briefly, the U-Net employs repeated application of convolutions, each followed by an activation function and a max pooling operation. During the contraction, the spatial information is reduced while feature information is increased. The expansive pathway combines the feature and spatial information through a sequence of up-convolutions and concatenations with high-resolution features from the contracting path.

Figure 1:
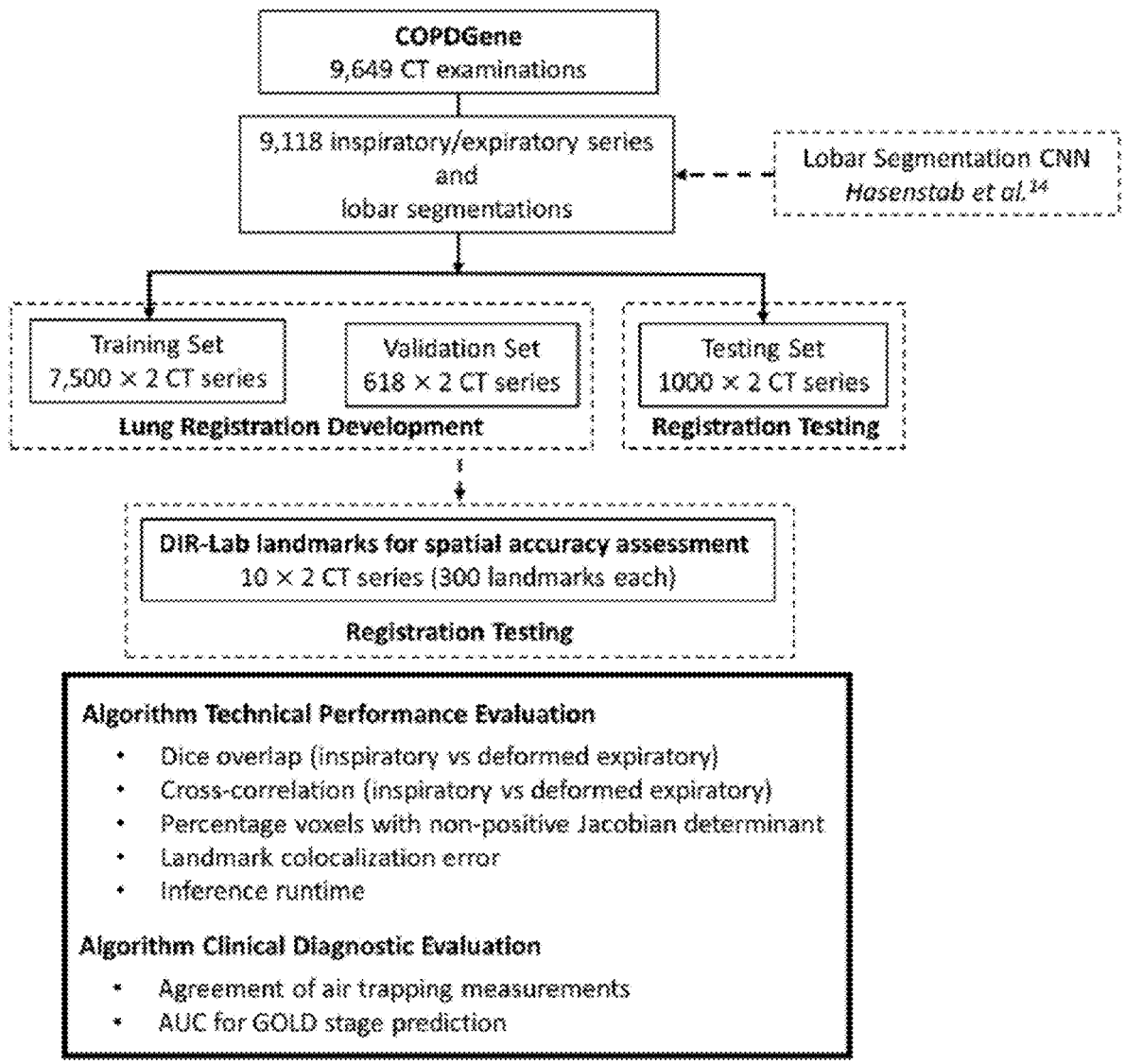
FIG. 1 is a diagram showing the study design used to evaluate the lung deformable registration algorithm (LungReg) using data from the public COPDGene dataset.

The inventive CNN-based deformable registration approach was evaluated using the study design shown in FIG. 1. A previously developed 3D lobar segmentation CNN (LungSeg) was first applied to the 9,118 inspiratory and expiratory series pairs from the COPDGene study, a multicenter observational study designed to identify genetic factors associated with COPD. The lung deformable registration algorithm ("LungReg") was trained to perform expiratory-to-inspiratory registration using the CT images and corresponding lobar segmentations. LungReg was then evaluated across several technical and clinical diagnostic metrics. Abbreviations used in the figure and throughout the specification: "AUC"=area under the receiver operating characteristic curve; "COPD"=chronic obstructive pulmonary disease; "DIR-Lab"=Deformable Image Registration Laboratory; and "GOLD"=Global Initiative for Chronic Obstructive Lung Disease.

A retrospective HIPAA-compliant study was approved by the institutional review boards of the participating institutions with waived requirement for written informed consent. Study data included non-contrast CT and spirometric data for 9,649 patients collected between 2007-2012 obtained as part of the COPDGene study. Exclusion criteria were missing inspiratory or expiratory CT (n=531), resulting in 9,118 patients that were included in this study. Demographics are provided in Table 1 below.

and expiratory acquisitions for the lungs and each lung lobe. To assess localization error of the proposed lung deformable registration, we obtained 10 inspiratory/expiratory CT series pairs publicly available through the DIR-Laboratory database. Each series pair contains 300 landmark annotations uniformly distributed across the entirety of both lungs as a reference standard.

Spirometric measurements included forced expiratory flow in one second (FEV1), percent predicted FEV1 (FEV1pp), and forced vital capacity (FVC) following administration of 180 μg of albuterol. Spirometric measure-

TABLE 1

| Characteristic | Training | Validation | Testing | All |
|---|---|---|---|---|
| Demographics | | | | |
| N | 7500 | 618 | 1000 | 9118 |
| Men | 53.27% | 51.78% | 52.70% | 53.10% |
| | (3995/7500) | (320/618) | (527/1000) | (4842/9118) |
| Race (% NHW) | 68.17% | 69.74% | 68.90% | 68.36% |
| | (5113/7500) | (431/618) | (689/1000) | (6233/9118) |
| Age | 59.65 ± 8.99 | 59.67 ± 9.26 | 59.76 ± 9.00 | 59.67 ± 9.01 |
| BMI | 28.80 ± 6.22 | 29.38 ± 6.43 | 28.67 ± 6.13 | 28.82 ± 6.23 |
| Pack years | 44.24 ± 24.91 | 44.73 ± 25.63 | 44.16 ± 23.93 | 44.26 ± 24.85 |
| Current smokers | 51.81% | 51.29% | 52.00% | 51.80% |
| | (3886/7500) | (317/618) | (520/1000) | (4723/9118) |
| Spirometry | | | | |
| N | 7453 | 615 | 993 | 9061 |
| FEV1 | 2.26 ± 0.91 | 2.30 ± 0.96 | 2.23 ± 0.94 | 2.25 ± 0.92 |
| FEV1pp | 76.83 ± 25.60 | 78.04 ± 25.85 | 75.19 ± 25.30 | 76.73 ± 25.59 |
| FVC | 3.32 ± 1.00 | 3.34 ± 1.07 | 3.30 ± 1.00 | 3.32 ± 1.00 |
| FVCpp | 87.27 ± 18.18 | 87.95 ± 19.27 | 86.44 ± 17.34 | 87.22 ± 18.16 |
| FEV1/FVC | 0.67 ± 0.16 | 0.67 ± 0.16 | 0.66 ± 0.16 | 0.67 ± 0.16 |
| GOLD 0 | 3286 | 284 | 413 | 3983 |
| GOLD 1 | 581 | 46 | 74 | 701 |
| GOLD 2 | 1419 | 109 | 203 | 1731 |
| GOLD 3 | 818 | 71 | 142 | 1031 |
| GOLD 4 | 447 | 32 | 52 | 531 |
| PRISm | 902 | 73 | 109 | 1084 |
| N | 7500 | 618 | 1000 | 9118 |
| % EM-LAA | 6.12 ± 9.78 | 5.79 ± 9.34 | 6.47 ± 9.87 | 6.13 ± 9.76 |
| Perc15 | −915.85 ± 31.78 | −915.07 ± 31.13 | −916.14 ± 32.84 | −915.83 ± 31.85 |
| Mean atten. | −838.44 ± 36.67 | −836.90 ± 36.01 | −838.68 ± 38.33 | −838.36 ± 36.81 |
| Volume (liters) | 5.47 ± 1.43 | 5.45 ± 1.41 | 5.47 ± 1.44 | 5.47 ± 1.43 |
| N | 7500 | 618 | 1000 | 9118 |
| % AT-LAA | 22.72 ± 20.92 | 22.14 ± 19.46 | 23.94 ± 21.38 | 22.82 ± 20.87 |
| Perc 15 | −859 ± 59.23 | −860.01 ± 56.34 | −861.45 ± 60.09 | −859.43 ± 59.13 |
| Mean atten. | −735.31 ± 72.57 | −734.47 ± 68.12 | −738.23 ± 73.75 | −735.57 ± 72.41 |
| Volume (liters) | 3.23 ± 1.18 | 3.20 ± 1.09 | 3.26 ± 1.16 | 3.23 ± 1.17 |

Table notes:
Categorical data are reported as a percentage and frequency.
Continuous data are reported as mean ± SD.
Reported imaging statistics are based on measurements produced by commercial software, Thirona, already included in the COPDGene dataset, used as a reference standard for LungSeg performance evaluation.
Characteristic definitions: % NHW = Percentage non-Hispanic White, BMI = Body mass index, FEV1 = Forced expiratory volume in 1 second, FEV1pp = Percent predicted FEV1, FVC = Forced vital capacity, FVCpp = Percent predicted FVC, GOLD = Global Initiative for Chronic Obstructive Lung Disease, PRISm = Preserved ratio impaired spirometry, % EM-LAA = Percent emphysema defined by low attenuation area on inspiratory, Perc15 = 15% percentile of attenuation distribution, % AT-LAA = Percent air trapping defined by low attenuation area on expiratory.

Inspiratory (200 mAs) and expiratory (50 mAs) CT series of the entire thorax were acquired without contrast using multidetector General Electric, Philips, or Siemens scanners, each with at least 16 detector channels. Images were reconstructed using a standard soft tissue kernel, utilized submillimeter slice thickness (0.625-0.9 mm) and intervals (0.45-0.625 mm), with smooth and edge-enhancing algorithms.

The COPDGene dataset also included lung CT measurements computed by commercialsoftware (Thirona): mean attenuation (Hounsfield units [HU]), lung volume (liters), attenuation 15th percentile (HU), and LAA-defined percentage emphysema (% voxels≤−950 HU, % EM-LAA) or air trapping (% voxels≤−856 HU, % AT-LAA) from inspiratory ments were used to classify patients according to the GOLD staging system for COPD severity.

Figure 2:
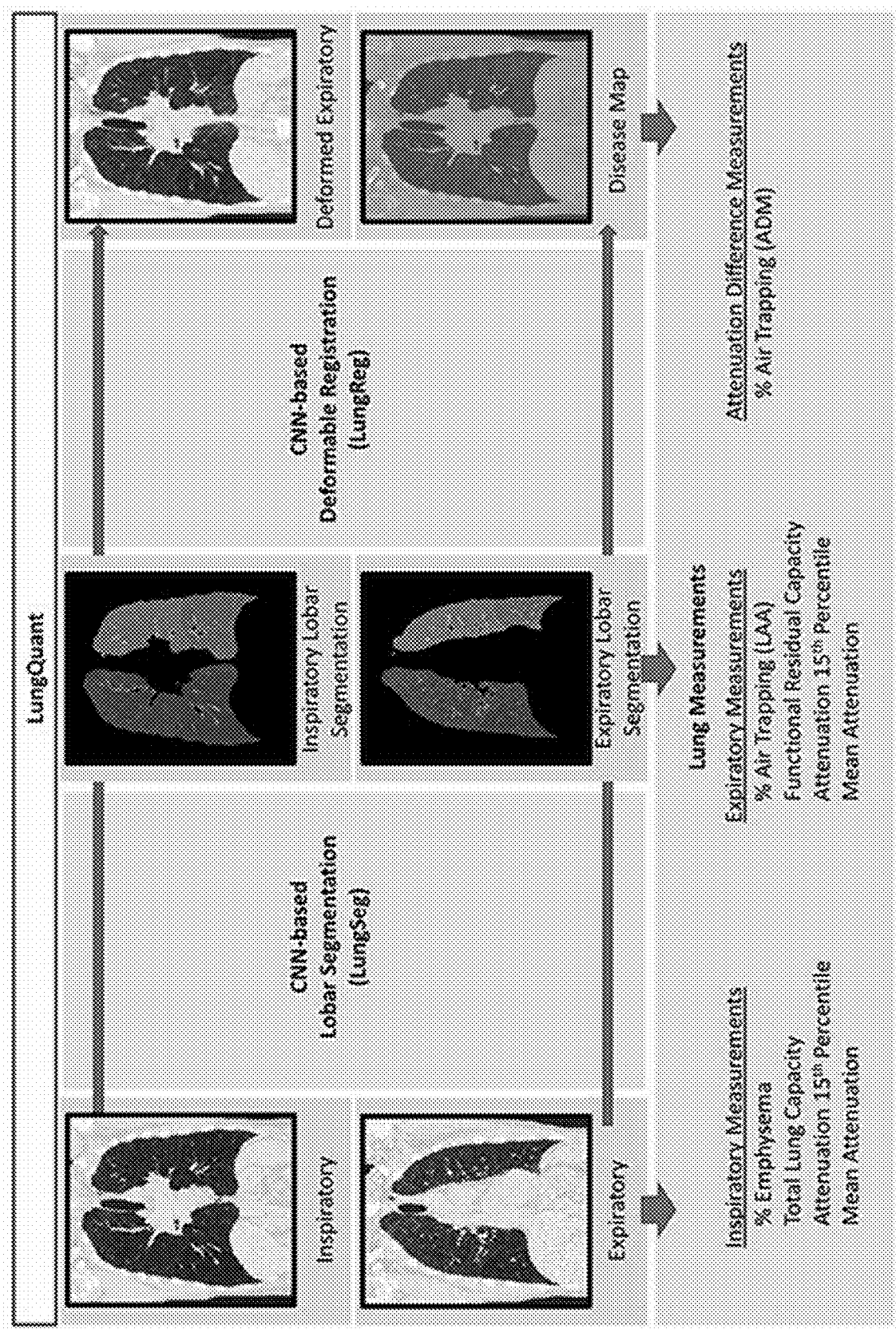
FIG. 2 is a flow diagram for the LungQuant system for fully automated lung CT measurements.

Referring to FIG. 2, to perform automated lung CT measurements, LungSeg and LungReg can be combined together as "LungQuant". Inspiratory and expiratory series are first propagated through LungSeg, a CNN algorithm for lung lobe segmentation. Expiratory series are then deformably registered to inspiratory series using the CNN-based lung deformable registration algorithm LungReg to co-localize the lungs at the voxel level. Lobar segmentations are then used to extract various lung measurements, including air trapping, from the inspiratory, expiratory, and deformed expiratory images. Inspiratory and deformed-expiratory images can also be used to create disease maps for visual assessment of emphysema and air trapping severity. Details of the LungSeg and LungReg algorithms are described below.

Figure 3A:
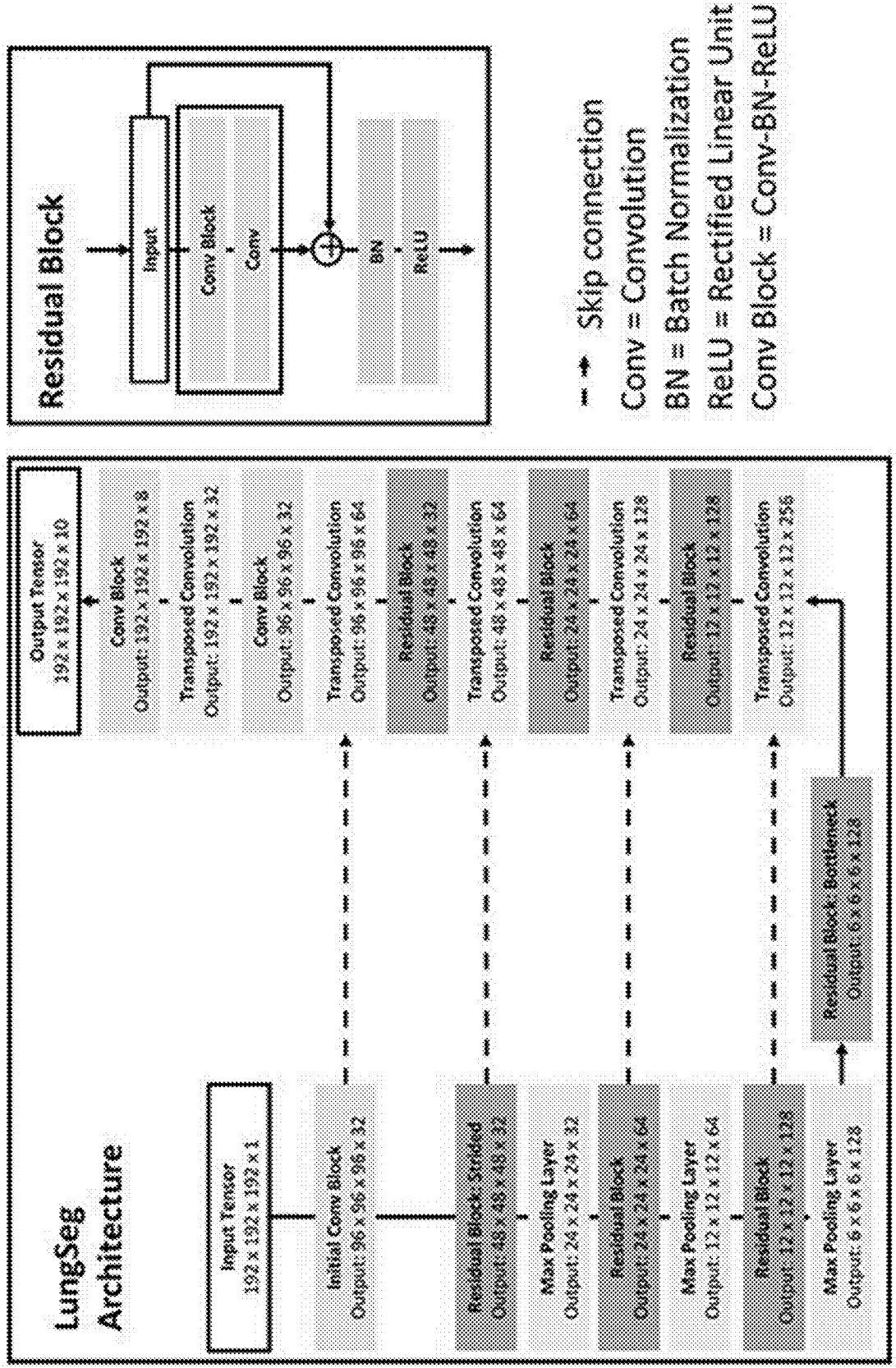
FIG. 3A is diagram of the architecture for U-Net inspired LungSeg algorithm for lung and lobe segmentation.

LungSeg: Referring to FIG. 3A, LungSeg is designed to segment the lungs, lung lobes, and trachea using a single volumetric lung CT as input. (See Hasenstab et al. ("Automated CT Staging of Chronic Obstructive Pulmonary Disease Severity for Predicting Disease Progression and Mortality with a Deep Learning Convolutional Neural Network", *Radiol Cardiothorac Imaging* 2021; 3 (2): e200477, incorporated herein by reference)). LungSeg enables quantification of lung CT measurements, including air trapping, across the lungs and lung lobes.

The LungSeg architecture is designed to maximize the size and detail of the input array (192× 192× 192) while accounting for graphics processing unit (GPU) memory limitations during training through rapid down-sampling and up-sampling in the encoder and decoder layers of the U-Net. It may be noted that other architectures may work similarly well for the task of lobar segmentation. The goal of LungSeg is to enable quantification of lung CT measurements, including air trapping, across the lungs and lung lobes.

LungSeg was developed using a retrospective convenience sample of 1037 volumetric CT series from 888 current or former smokers undergoing lung cancer screening at multiple institutions (Inst. 1 & 2). Six hundred twenty-one series were obtained as part of the National Lung Screening Trial and 416 series were sampled from another institution between August 2008 and October 2018. Demographic information was not available due to complete anonymization of imaging data. A summary of the scanners and imaging parameters (sample size, mean±SD, range) used for LungSeg development and testing are provided in Table 2 below.

TABLE 2

|  | Low Dose-Inst. 1 | NLST | |
|---|---|---|---|
|  |  | Low Dose-Inst. 1 | Low Dose-Inst. 2 |
| N | 416 | 341 | 280 |
| Scanner Mfr. | | | |
| GE Medical | 384 | 221 | 95 |
| Philips | 10 | 6 | — |
| Siemens | 7 | 82 | 185 |
| Toshiba | 15 | 32 | — |
| Imaging Param. | | | |
| Tube Current (mA) | 169.74 ± 227.24 (40-1580) | 92.68 ± 32.42 (50-225) | 127.45 ± 60.95 (40-320) |
| kVp | 116.15 ± 8.92 (100-140) | 120.12 ± 1.53 (120-140) | 120.93 ± 4.22 (120-140) |
| Reconstruction Diameter (mm) | 340.68 ± 38.70 (263-500) | 342.34 ± 36.25 (230-440) | 345.21 ± 37.24 (260-468) |
| Pixel Spacing (mm) | 0.67 ± 0.08 (0.51-0.98) | 0.67 ± 0.07 (0.45-0.86) | 0.62 ± 0.12 (0.34-0.91) |
| Slice Spacing (mm) | 1.27 ± 1.95 (0.3-10) | 1.52 ± 0.36 (0.625-2) | 1.85 ± 0.54 (1-5) |
| Slice Thickness (mm) | 1.26 ± 1.85 (0.5-5) | 2.07 ± 0.53 (1.0-3.2) | 2.08 ± 0.54 (1.25-5) |
| Slice Dimensions (pixels) | 512 × 512 | 512 × 512 | (433-768) × (512-768) |
| Convolutional kernels | | | |
| I70f | 2 | — | — |
| B | 3 | — | — |
| B20f | 1 | — | — |
| B30f | — | 80 | 184 |
| B50f | — | — | 1 |
| B70f | 4 | 2 | — |
| BONE | 1 | — | — |
| BONE+ | 202 | — | — |
| C | 1 | 6 | — |
| CHST | 2 | — | — |
| E | 1 | — | — |
| FC03 | 2 | — | — |
| FC08 | 1 | — | — |
| FC10 | — | 32 | — |
| FC15 | 3 | — | — |
| FC30 | 1 | — | — |
| FC50 | 7 | — | — |
| FC52 | 1 | — | — |
| L | 4 | — | — |
| LUNG | 20 | — | — |
| SOFT | 121 | — | — |
| STANDARD | 38 | 221 | 95 |
| YB | 1 | — | — |

Using Coreline, a commercially available software for artificial intelligence (AI)-based imaging diagnosis, ground truth segmentations were created for each of the 1037 CT series. Segmentations included masks of the trachea and left lower, left upper, right lower, right middle, and right upper lobes. Corrections to ground-truth segmentations were made using an ITK-Snap, an open-source graphical application for medical image segmentation, to ensure accuracy CT series and corresponding ground-truth masks were standardized to feet-first supine orientation and resized to 192×192×192 resolution using cubic spline interpolation. CT voxel attenuations were then scaled by a factor of 1/3000 to stabilize training while maintaining the attenuation distribution across all series. Ground-truth masks were first represented by a single 192×192×192 array(S) with the following encoding: 11 left lower, 12 left upper, 13 right lower, 14 right middle, 15 right upper, 16 trachea. Edge gradients $\|\nabla s(v)\|$ were then calculated for each voxel $v=(v_x, v_y, v_z)$ across the ground-truth lobar masks to create masks of the fissures separating the lobes:

$$\|\nabla s(v)\| = \left(\frac{\partial s(v)}{\partial x}, \frac{\partial s(v)}{\partial y}, \frac{\partial s(v)}{\partial z}\right),$$

such that $$\frac{\partial s(v)}{\partial x} \approx s(p_x+1, p_y, p_z) - s(p_x, p_y, p_z).$$

Similar approximations were used for $$\frac{\partial s(v)}{\partial y} \text{ and } \frac{\partial s(v)}{\partial z}.$$

Ground-truth masks were then converted to a 192×192×192×10 channel array representing masks of the lungs, fissures, lung lobes, and trachea. Referring to the right panel of FIG. 3A, convolutional blocks comprise a 3D convolutional, batch normalization (BN), and ReLU layer.

For characterization of the LungSeg CNN, image preprocessing was first performed. Inspiratory and expiratory series and segmentations were standardized feet-first-supine and resized to 192×192×192 resolution using cubic spline interpolation. CT voxel attenuations were scaled by a factor of 1/3000. Expiratory whole lung masks were then affine-registered (translation, rotation, scaling, no shearing) to inspiratory whole lung masks for initial lung alignment using mutual information as an image similarity metric within the Advanced Normalization Tools (ANTsPy v0.2.2) package, an optimized and validated medical imaging library for Python. Affine parameters were subsequently applied to the expiratory series.

Following the flow shown in the left panel of FIG. 3A, LungSeg takes as input a 192×192×192×1 array representing a volumetric lung CT and outputs a 192×192×192×10 array representing the masks of the lungs, fissures, lung lobes, and trachea. Convolutional blocks throughout the architecture comprise a 3D convolutional layer with kernel size 3, followed by a batch normalization layer with momentum 0.9, and rectified linear unit (ReLU) layer. In addition to skip connections, residual blocks are used throughout the architecture to mitigate vanishing gradients. The input image is initially processed using a convolutional block with stride 2 and is followed by a strided residual block and max pooling layer, each further reducing spatial dimension by half; the strided residual block uses a stride of 2 in the first convolutional layer. Rapid downsampling in these layers allows the architecture to process subtle imaging features such as fissures that are only visible at higher resolutions while reducing memory consumption. Feature maps are subsequently propagated through additional residual blocks and max pooling layers until arriving at 6×6×6×128 resolution in the bottleneck. The decoder portion of the network then uses a sequence of transposed convolutions and residual blocks to process and upsample the feature maps to input resolution for prediction of masks.

LungSeg was trained using the Dice loss function, equally weighted across the 10 anatomic structures. Let $S_k$ and $\hat{s}_k$, where k=1, ..., 10 represent the ground-truth and predicted segmentations for structure k. The Dice loss $L_{seg}$ finds the average volumetric overlap between each of the respective structures, $$\mathcal{L}_{seg} = -\frac{1}{10}\sum_{k=1}^{10} 2\frac{|s_k \cap \hat{s}_k|}{|s_k| + |\hat{s}_k|}.$$

Dice values were equally weighted across structures to compensate for the pixel imbalance between the sparse fissure masks and dense lung masks, thus increasing focus on the fissure separations between the lobes.

CT series and ground-truth segmentations were partitioned at the patient level using a 90%/10% training-validation split (934 training, 103 validation). LungSeg was then trained using the Adam stochastic optimizer with an initial learning rate of 0.001 and a batch size of 2 for 10 epochs. The pretrained model was then fine-tuned with a learning rate of 0.0001 while dynamically applying random rotations (−15 and 15 degrees), shifts (−8 to 8 pixels), and zoom (80%-110%) to images during training. Training was terminated when the validation loss stopped improving.

LungSeg was then applied to the 9,118 inspiratory and expiratory series from COPDGene for external testing. COPD CT measurements were calculated for each lung and lung lobe: 1) percentage lung voxels with low attenuation area (LAA, attenuation≤−950) on inspiratory (% emphysema [% EM]), 2) percentage lung voxels with LAA (attenuation≤−856) on expiratory (% air trapping LAA [% AT-LAA]), and for both inspiratory and expiratory, 3) volume (liters), 4) attenuation 15th percentile (Perc15), and 5) mean attenuation (1). Agreement between LungSeg measurements and measurements from commercially available software included in COPDGene was assessed.

Agreement for both inspiratory and expiratory measurements was very strong (Intraclass Correlations (ICCs)>0.9) across each structure, with the exception of mean attenuation for the right middle lobe. A lower mean attenuation ICC was also observed across all structures, likely due to the inclusion of high attenuation vasculature within the lobar segmentations used to derive the COPDGene measurements.

LungReg: For the LungReg CNN, imaging preprocessiong was performed using the same procedure used for LungSeg. The LungReg algorithm is based on the VoxelMorph deformable registration framework, initially validated for brain registration. (See Balakrishnan G, et al., "VoxelMorph: A Learning Framework for Deformable Medical Image Registration", IEEE Trans Med Imaging 2019; 38 (8): 1788-1800.) Inspiratory and affine-registered expiratory images are first propagated through a 3D U-Net CNN, using the input-level fusion mode to spatial transformation function φ parameterized by displacement field u.

The spatial transformation is then applied to the affine-registered expiratory image, via spatial transformer layer, to deformably register the affine-registered expiratory image to the inspiratory image. The U-Net is trained to predict a displacement field that maximizes colocalization of anatomic structures between the inspiratory and deformed expiratory images resulting from the output level.

Figure 3B:
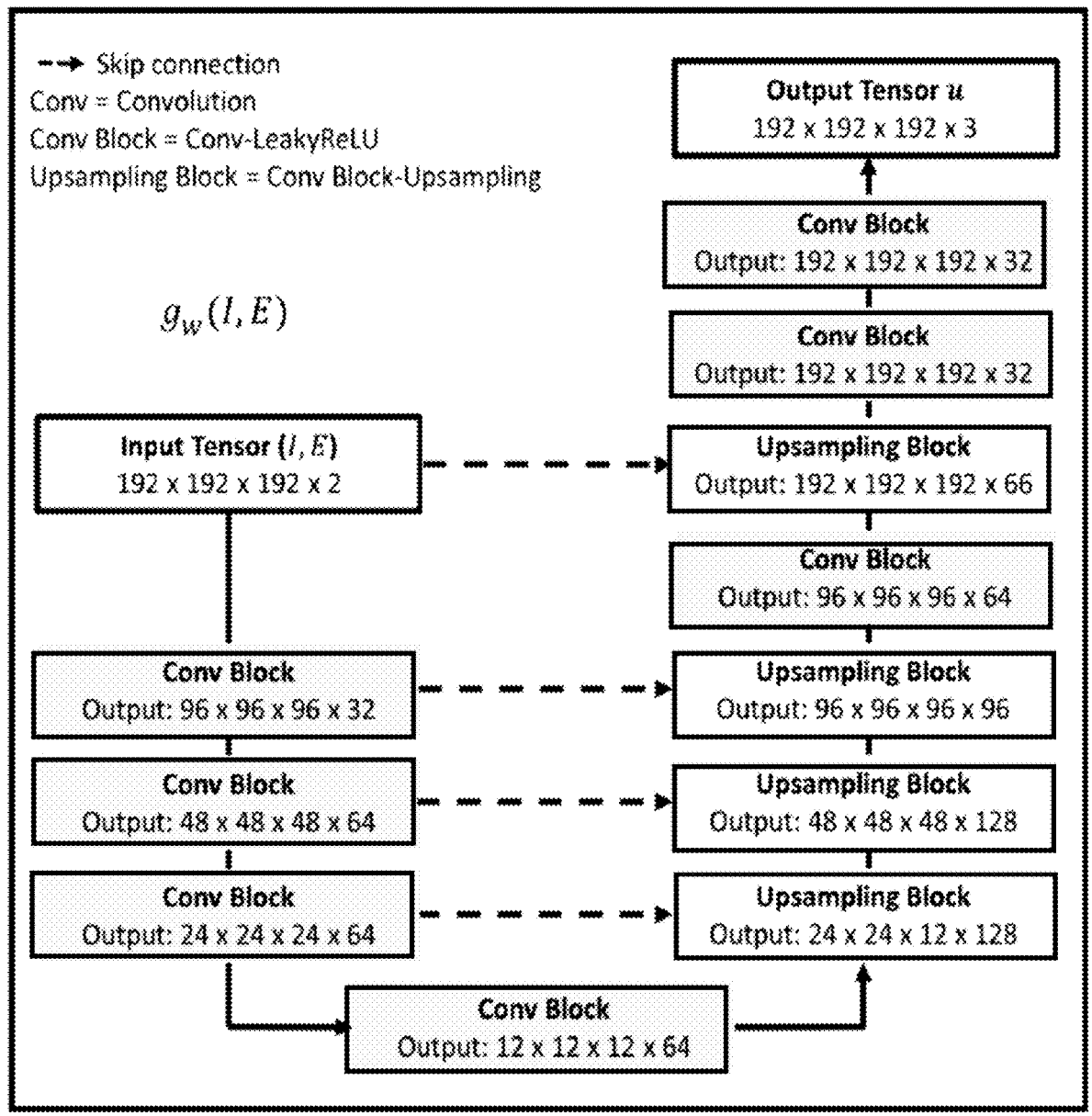
FIG. 3B is a diagram of the architecture for an implementation of the exemplary 3D U-Net CNN LungReg used to predict the displacement field defining the deformation.

The CNN architecture of $g_w(I,E)$, shown in FIG. 3B, is an expanded version of the architecture reported by Balakrishnan, et al. The CNN takes as input a 192× 192× 192× 2 array representing/and/concatenated along the channel axis. Output of $g_w(I,E)$ is a 192×192×192×3 array representing the predicted displacement field u. The encoder of $g_w(I,E)$ comprises sequences of 3D convolutions with stride 2 and kernel size 3, each followed by a LeakyReLU layer with parameter 0.2. The decoder alternates between convolutions, LeakyReLU layers, and 3D upsampling. The spatial transformer E·φ is a differentiable layer within the LungReg network that linearly interpolates across its eight neighboring voxel attenuations.

Gradient descent is used to optimize U-Net weights by minimizing a loss function comprising four components, which point to the U-Net since they are used to optimize U-Net weights: (1) cross-correlation for image similarity ($L_{CC}$), displacement regularization for smooth deformations ($L_\varphi$), (3) Dice overlap score for alignment of anatomic structures ($L_{seg}$), and (4) percentage of voxels with nonpositive Jacobian determinants ($L_{jac}$) to encourage transformation invertibility. Note the segmentations are only used during LungReg training and are not required during inference time.

Figure 3C:
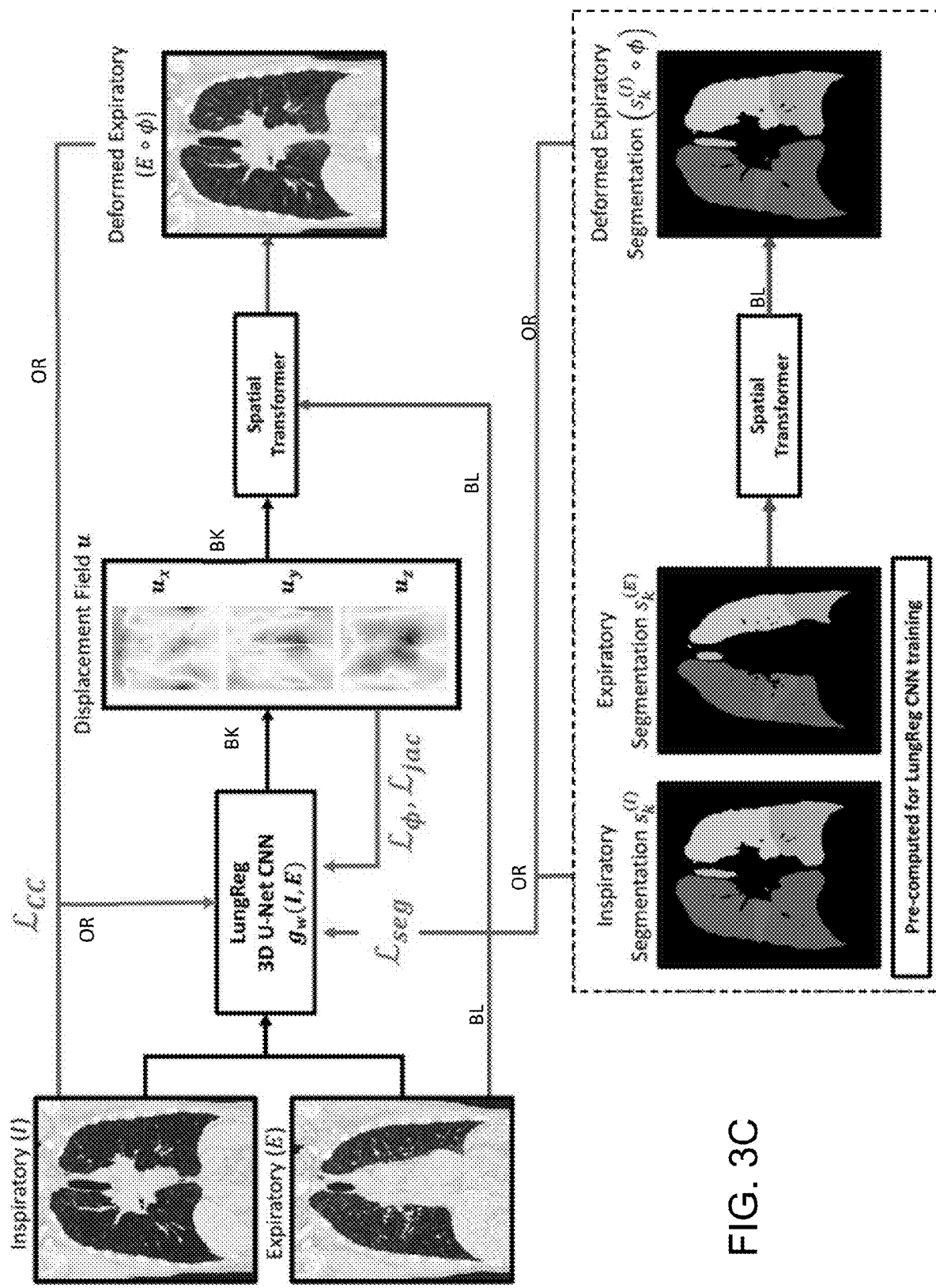
FIG. 3C is a flow diagram of loss functions incorporated into the training of the lung deformable image registration algorithm, LungReg.
Figure 4A:
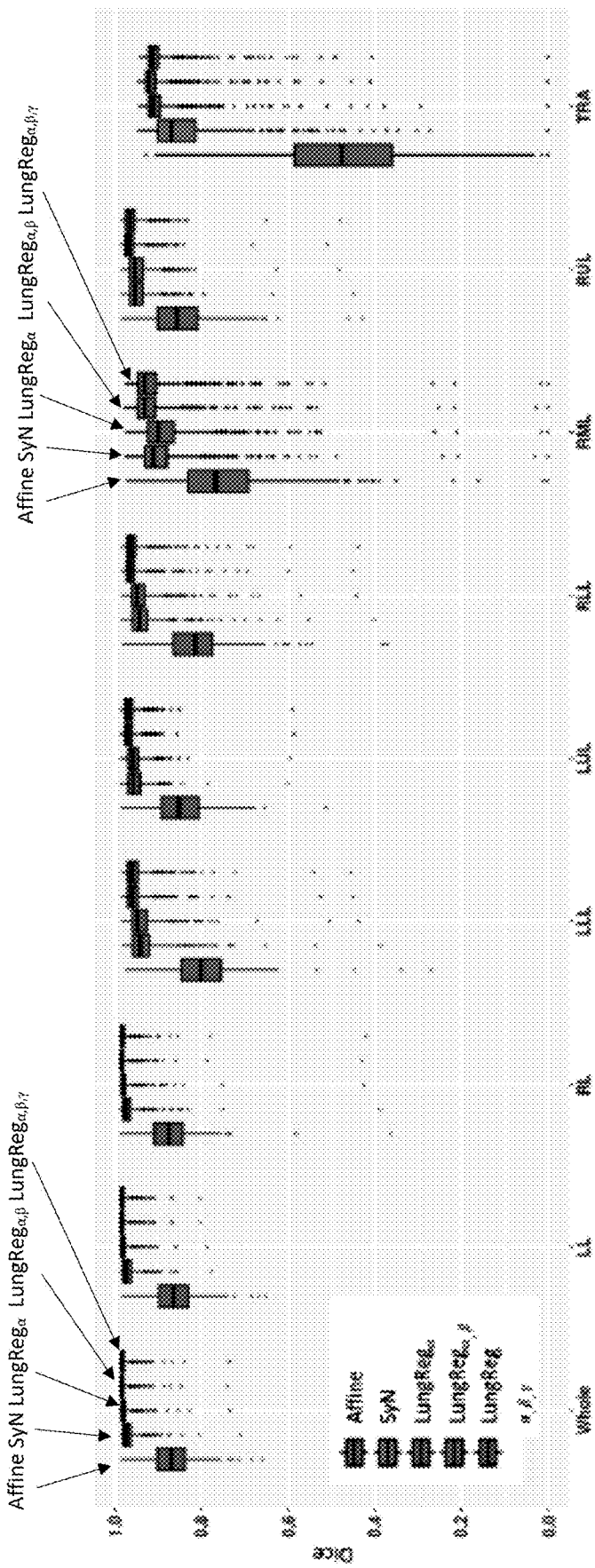
FIGS. 4A-4D plot Dice scores and cross-correlations across algorithms and anatomic structures (FIGS. 4A, 4C) and paired differences with SyN (FIG. 4B, 4D), respectively, for different lung regions.
Figure 4B:
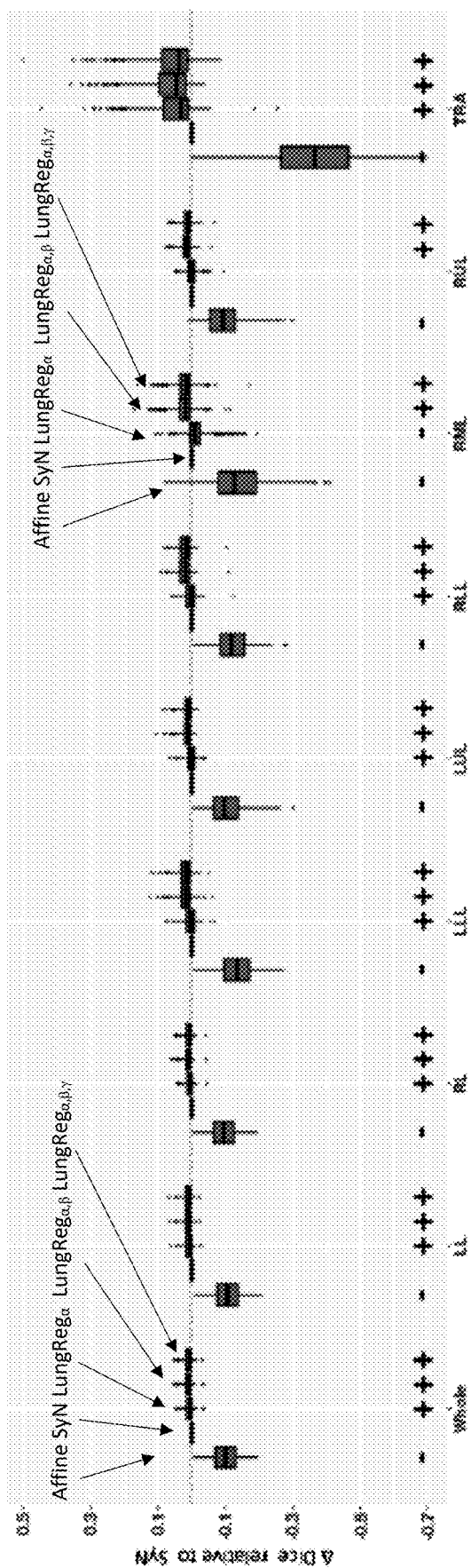
Figures 4C, 4D:
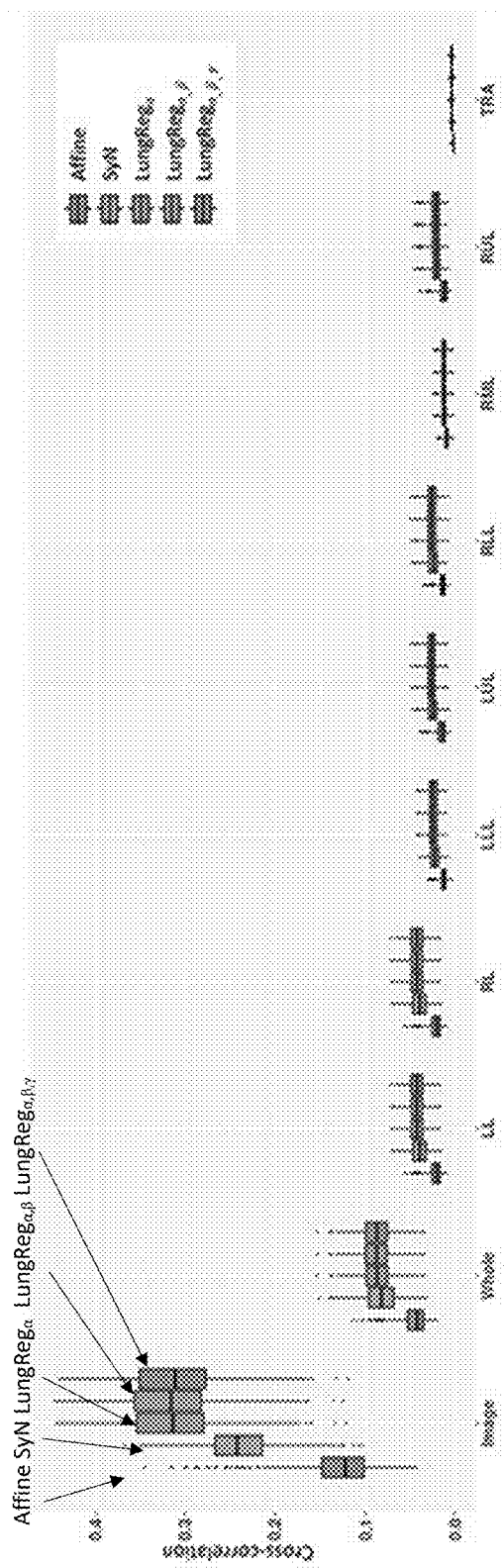

FIG. 3C provides a flow-diagram of loss functions incorporated into the training of LungReg, where back lines ("BK")=forward propagation; blue lines ("BL")=spatial transformations; orange lines ("OR")=loss functions. Inspiratory (I) and affine-registered expiratory (E) images are propagated through a 3D U-Net CNN $g_w(I,E)$ with weights w to predict a spatial transformation function φ parameterized by displacement field u. The spatial transformation is then applied to the expiratory image (E∘φ) via spatial transformer layer to deform E such that attenuation values I(v) and [I∘φ](v) correspond to similar anatomic locations. Given I, E, network g is trained to predict a displacement field u that maximizes colocalization of anatomic structures between I and E by minimizing a loss function, discussed below.

Cross-correlation loss ($L_{CC}$) encourages local similarity between inspiratory and affine-registered expiratory images while being robust to shifts in attenuation distribution attributed to higher density areas of the lungs typically observed in expiratory phase acquisitions. Let B represent a local volume of size $b^3$ surrounding a voxel v and let $(\hat{I})v$ represent inspiratory mean attenuation across voxels $v_i$ surrounding v such that $\hat{I}(v)=\Sigma_{v_i \in B}I(v_i)$; $[\hat{E}\circ\varphi](v)$ is defined similarly. The cross-correlation loss between I and $\hat{E}\circ\phi$ is defined as $$\mathcal{L}_{cc}(I, E, \phi) = -\sum_{v \in \Omega} \frac{\left(\sum_{v_i \in B}(I(v_i) - \hat{I}(v))([E\circ\phi](v_i) - [\hat{E}\circ\phi](v))\right)^2}{\left(\sum_{v_i \in B}(I(v_i) - \hat{I}(v))^2\right)\left(\sum_{v_i \in B}([E\circ\phi](v_i) - [E\circ\phi](v))^2\right) + \varepsilon},$$

ε is a parameter designed to stabilize network training. Smaller values of $L_{CC}$ imply higher cross-correlations between images, indicative of stronger image similarity. Hyperparameters b and ε were selected during training.

Displacement field loss (Lφ): Physically realistic transformations are encouraged by regularizing the smoothness of the displacement field through a constraint on the magnitude of spatial gradients within the displacement field using the following loss:

$$\mathcal{L}_\phi(\phi) = \sum_{v \in \Omega} \|\nabla u(v)^2\|,$$

where $$\nabla u(v) = \left(\frac{\partial u(v)}{\partial x}, \frac{\partial u(v)}{\partial y}, \frac{\partial u(v)}{\partial z}\right) \text{ and } \frac{\partial u(v)}{\partial x} \approx u(v_x+1, v_y, v_z) - u(v_x, v_y, v_z).$$

Approximations for $$\frac{\partial u(v)}{\partial y} \text{ and } \frac{\partial u(v)}{\partial z}$$

are performed similarly.

Dice loss ($L_{seg}$): During LungReg training, overlap of the trachea and five lung lobes corresponding to the inspiratory and deformed expiratory segmentations is encouraged using a Dice loss function. The Dice loss is calculated as the average Dice across the six structural segmentations:

$$\mathcal{L}_{seg}(s^{(I)}, s^{(E)}, \phi) = -\frac{1}{6}\sum_{k=1}^{6} 2\frac{|s_k^{(I)} \cap (s_k^{(E)}\circ\phi)|}{|s_k^{(I)}| + |s_k^{(E)}\circ\phi|}.$$

Jacobian loss ($L_{jac}$): An additional displacement field penalty is imposed by regularizing its Jacobian determinants to encourage deformations that result in fewer regions of noninvertibility (i.e., "foldings"). Let $J_\varphi(v)=\nabla\phi(v)$ represent the Jacobian matrix of φ for voxel v and let det $[J_\varphi(v)]$ represent its determinant. The Jacobian loss imposes a stronger loss penalty on deformation fields with a large number of nonpositive Jacobian determinants, $$\mathcal{L}_{jac} = \frac{1}{2}\sum_v (|\det[J_\phi(v)]| - \det[J_\phi(v)]).$$

The LungReg loss function is a linear combination of the four losses, $$L_{reg}=L_{CC}+\alpha L_\varphi+\beta L_{seg}+\gamma L_{jac},$$

where α, β, γ>0 are parameters that control the impact of the respective loss component on the LungReg loss function.

For training the LungReg CNN, series pairs and segmentations were randomly partitioned to 7500 for training, 618 pairs for validation and 1000 pairs for testing. LungReg was then trained using the Adam stochastic optimizer with an initial learning rate of 0.0001 and a batch size of 1 for 20 epochs (150,000 steps). For each run, training was terminated when the validation loss stopped improving. Since a single training run lasted ~48 hours, a greedy search across hyperparameters was not feasible. The cross-correlation loss was assigned a window of size b=9 and & was set as 10 since smaller values of ε tended to destabilize training, possibly due to lack of attenuation variability within many of the cross-correlation windows. We optimized α, β, and γ in successive order, first optimizing α: α={0, 0.01, 0.1, 0.5, 1, 2}; β=0; γ=0, then β: α=1; β={0, 0.01, 0.1, 0.5, 1, 2}; γ=0, then γ: α=1; β=0.1; γ={0, $10^{-6}$, 2× $10^{-6}$, $10^{-3}$, $10^{-1}$, 1}. We denote the final model with optimal regularization parameters, α=1; β=0.1; γ=2×$10^{-6}$ as "LungReg$_{\alpha,\beta,\gamma}$." Note that training of LungReg is completely unsupervised when β=0 and does not require a ground-truth. LungReg when β≠0 is a semisupervised algorithm that requires the ground-truth lobar segmentations. However, ground-truth lobar segmentations are not required during test time. The CNN was trained in Python v3.6 using the tensorflow-gpu v2.2.0 deep learning library on a NVIDIA Quadro RTX 8000 graphics card.

For testing, LungReg$_{\alpha,\beta,\gamma}$ was compared with affine registration as a naive benchmark, an iterative symmetric diffeomorphic registration (SyN) deformable registration algorithm and versions of LungReg with alternative loss functions excluding $L_{seg}$ and $L_{jac}$ (LungReg$_\alpha$) or $L_{jac}$ (LungReg$_{\alpha,\beta}$). Using the testing set, algorithms were compared using Dice overlap between inspiratory and registered expiratory segmentations, cross-correlation between inspiratory and registered expiratory series, and percentage voxels with nonpositive Jacobian determinant. Spatial accuracy for each algorithm was also assessed using landmark colocalization error (LCE) measured by 3D Euclidean distance in millimeters (mm) between inspiratory and deformed expiratory landmarks for the 10 DIR-Laboratory reference cases.

CPU-based runtimes for affine, SyN, and LungReg inference on the testing set were recorded in seconds. GPU-based runtimes for LungReg inference were also recorded.

Performance Analysis

We computed attenuation difference air trapping (% AT-ADM), defined as the percentage nonemphysematous voxels with attenuation differences≤100 HU between the deformed expiratory and inspiratory series. Agreement between % AT-ADM measurements computed using LungReg or SyN was assessed. We also compared the ability of LungReg and SyN to predict the spirometrically-defined GOLD stages using % EM-LAA and % AT-ADM as predictors.

Statistical analysis was performed using RStudio (v3.6.1). Agreement was assessed using intraclass correlation (ICC). Dice overlapscores, cross-correlations, and percentage nonpositive Jacobian determinants were compared across algorithms using paired/tests. LCE for each algorithm was compared using a linear mixed effects model to account for correlations between within-patient observations, with landmarks nested within patients as random effects and a four-level categorical variable representing SyN and each LungReg algorithm as a fixed effect. Bonferroni correction was used to control for familywise error rate. 95% confidence intervals were analytically calculated as appropriate. Statistical significance was assessed using a 5% Type I error threshold; any use of the word "significance" refers to statistical significance. Runtimes were reported descriptively. GOLD stage prediction was performed using logistic regressions and assessed using receiver operating characteristic (ROC) curve analysis; areas under the curve (AUCs) were calculated and compared using bootstrapping.

Dice scores and cross-correlations for each algorithm and corresponding paired differences with SyN are shown in FIGS. 4A-4B and 4C-4D, respectively. The x-axis labels in each plot are: Whole=both lungs; LL=left lung; RL=right lung; LLL=left lower lobe; LUL=left upper lobe; RLL=right lower lobe; RML=right middle lobe; RUL=right upper lobe; and TRA=trachea. α, β, γ correspond to LungReg with the cross-correlation loss, segmentation loss, and Jacobian loss, respectively. Significance and direction of paired differences are indicated by (+) and (−).

As expected, affine registration consistently produces significantly lower Dice scores and cross-correlations (P values<0.001) across all algorithms and structures. LungReg algorithms significantly outperformed SyN for all structures, except for the right middle and right upper lobes, where LungReg without the use of segmentations during training, and hence without any emphasis on lobar boundaries, produced significantly lower Dice (P values<0.001). LungReg$_{\alpha,\beta}$ and LungReg$_{\alpha,\beta,\gamma}$ with training segmentations showed a significant increase in Dice overlap (P values<0.001). LungReg cross-correlation was significantly greater than affine and SyN (P values<0.001), but differences with SyN were unsubstantial in magnitude for the individual lung structures. Percentage voxels with nonpositive Jacobian determinants for each algorithm is shown in Table 3, which lists the performance metrics comparing affine, SyN, and LungReg registration algorithms.

TABLE 3

| Method | Dice | % Folding Voxels | GPU Runtime (s) | CPU Runtime (s) |
|---|---|---|---|---|
| Affine | 0.81 ± 0.04 | \ | \ | 1.81 ± 0.21 |
| SyN | 0.93 ± 0.02 | 0.10 ± 0.13 | \ | 418.46 ± 246.47 |
| LungReg$_\alpha$ | 0.93 ± 0.03 | 0.51 ± 0.44 | 1.03 ± 0.04 | 2.27 ± 0.15 |
| LungReg$_{\alpha,\beta}$ | 0.95 ± 0.02 | 0.50 ± 0.43 | 1.00 ± 0.03 | 2.28 ± 0.15 |
| LungReg$_{\alpha,\beta,\gamma}$ | 0.95 ± 0.02 | 0.04 ± 0.05 | 0.99 ± 0.03 | 2.27 ± 0.15 |

Note that Dice scores are averaged across the five lung lobes. LungReg algorithms incorporating segmentations into training showed improvements in overlap of lung structures. We observed large percentages of "folding" voxels for LungReg$_{\alpha,\beta}$ and LungReg$_{\alpha,\beta,\gamma}$ relative to the other algorithms. However, incorporation of the Jacobian loss (LungReg$_{\alpha,\beta,\gamma}$) reduced the percentage of folding voxels below SyN while maintaining lobar overlap. LungReg CPU- and GPU-runtimes during inference are much faster than SyN.

LungReg algorithms without the Jacobian loss showed five times the percentage of nonpositive Jacobian determinants than SyN. However, LungReg$_{\alpha,\beta,\gamma}$ with the Jacobian loss had a significantly lower percentage of these voxels (P value<0.001) than all other algorithms, including SyN, and with less variability.

On CPU, affine runtime (see Table 3) was significantly faster than the deformable registration algorithms (P values<0.001). LungReg runtimes were magnitudes faster (418×) than SyN (P values<0.001), with considerably less runtime variability. LungReg implementation on GPU reduced runtime by half, requiring only ~1 second on average for inference.

The landmark colocalization error (LCE) was determined for each deformable registration algorithm across the 10 DIR-Laboratory reference cases. The error (in mm) is provided in Table 4. Average LCE for each algorithm was 7.21 to 7.81 mm for LungReg and 6.93 mm for SyN. SyN had the lowest LCE across all algorithms (P value<0.001), but LungReg$_{\alpha,\beta,\gamma}$ with the Jacobian loss had the lowest LCE of the CNN-based algorithms (P value<0.001).

TABLE 4

|  | SyN | LungReg$_\alpha$ | LungReg$_{\alpha,\beta}$ | LungReg$_{\alpha,\beta,\gamma}$ |
|---|---|---|---|---|
| Case 1 | 8.79 ± 6.14 | 10.44 ± 5.86 | 10.71 ± 5.73 | 9.98 ± 5.39 |
| Case 2 | 7.35 ± 5.24 | 9.92 ± 5.95 | 10.30 ± 6.32 | 9.20 ± 5.52 |
| Case 3 | 5.61 ± 2.89 | 4.24 ± 2.38 | 4.57 ± 2.77 | 4.21 ± 2.46 |
| Case 4 | 7.47 ± 5.12 | 7.76 ± 4.39 | 7.89 ± 4.59 | 7.51 ± 4.40 |
| Case 5 | 4.88 ± 3.15 | 6.83 ± 3.44 | 7.49 ± 3.74 | 6.62 ± 3.38 |
| Case 6 | 6.52 ± 4.41 | 6.66 ± 4.04 | 6.60 ± 3.98 | 6.09 ± 3.53 |
| Case 7 | 5.49 ± 2.75 | 5.03 ± 2.95 | 5.13 ± 2.93 | 4.76 ± 2.77 |
| Case 8 | 6.38 ± 3.84 | 7.15 ± 4.04 | 6.88 ± 3.99 | 6.82 ± 3.96 |
| Case 9 | 5.25 ± 3.23 | 6.31 ± 3.98 | 7.00 ± 4.87 | 6.54 ± 4.44 |
| Case 10 | 11.59 ± 5.94 | 10.02 ± 5.66 | 11.49 ± 6.13 | 10.39 ± 5.92 |
| Avg | 6.93 ± 4.27 | 7.44 ± 4.27 | 7.81 ± 4.50 | 7.21 ± 4.18 |

SyN LCEs were significantly lower than LungReg LCEs on average by 0.28 to 0.88 mm (P value<0.001). LungReg$_{\alpha,\beta,\gamma}$ with the segmentation loss significantly increased LCE, relative to LungReg (P value<0.001). However, incorporation of the Jacobian loss significantly reduced LCE below the other LungReg algorithms (P value<0.001), suggesting the reduction of voxel "folding" improved registration accuracy.

Example 1

Figure 5:
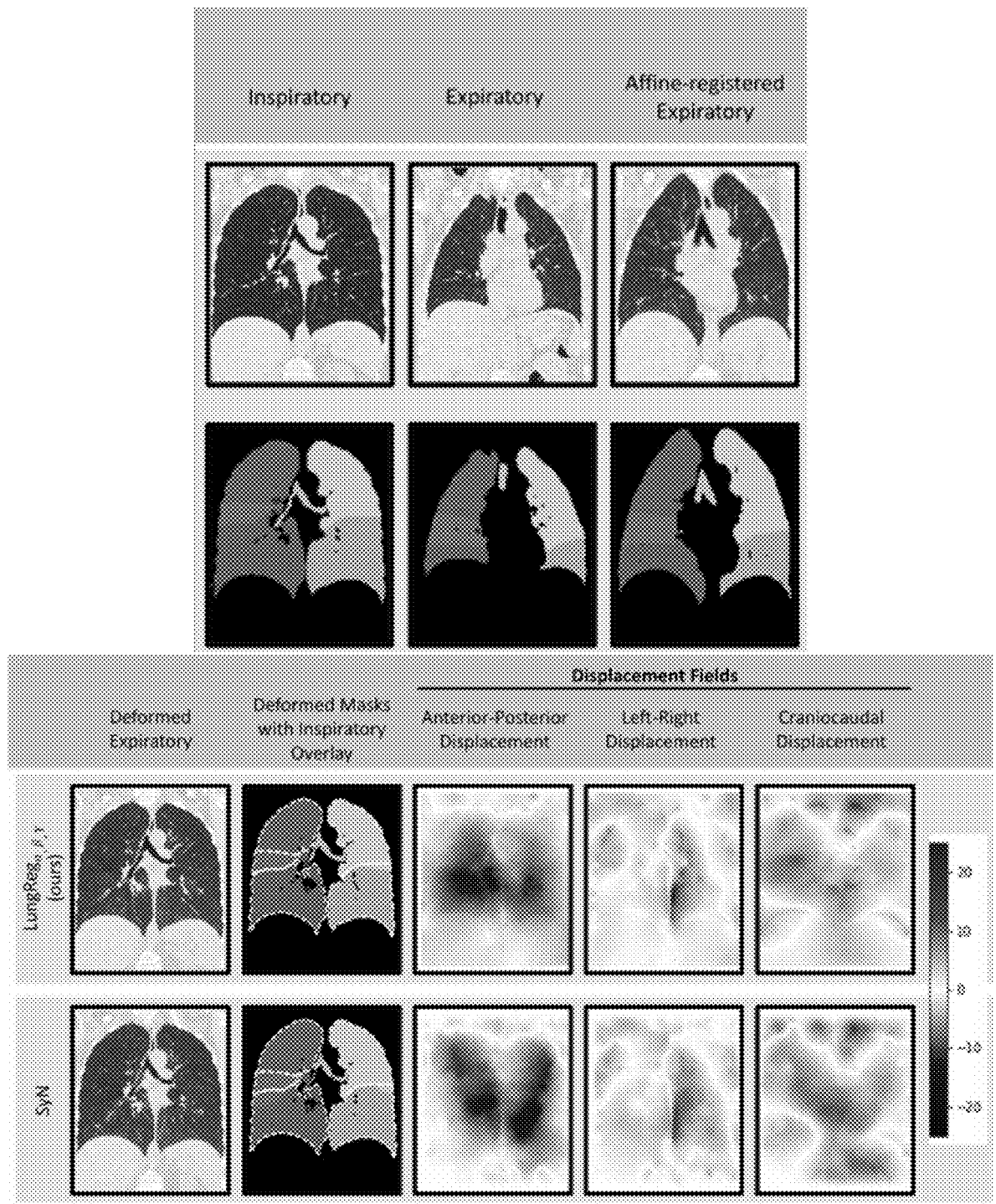
FIG. 5 illustrates a case example comparing deformed images, segmentations, and displacement fields for LungReg$_{\alpha,\beta,\gamma}$ and SyN.

A case example comparing deformed images, segmentations, and displacement filed for LungReg$_{\alpha,\beta,\gamma}$ and SyN in a test set participant is provided in FIG. 5. In the figure, dashed white lines are overlaid inspiratory segmentations. Positive displacements (red) are posterior-to-anterior, left-to-right, and inferior-to-superior. Deformed expiratory images appear similar across LungReg$_{\alpha,\beta,\gamma}$ and SyN. However, overlap of lung structures improves, especially for the right middle lobe (RML). Displacement fields suggest similar anatomic transformations between algorithms, but with greater emphasis on the lung boundaries, as evidenced by the lung outline presence visible in each LungReg$_{\alpha,\beta,\gamma}$ field. Incorporation of masks into LungReg$_{\alpha,\beta,\gamma}$ training improves overlap of lung structures, especially for the right middle lobe (LungReg Dice 0.93 versus SyN 0.87). Visual assessment of displacement fields suggests similar anatomic transformations between algorithms, but with greater emphasis on the lung boundaries.

Figure 6:
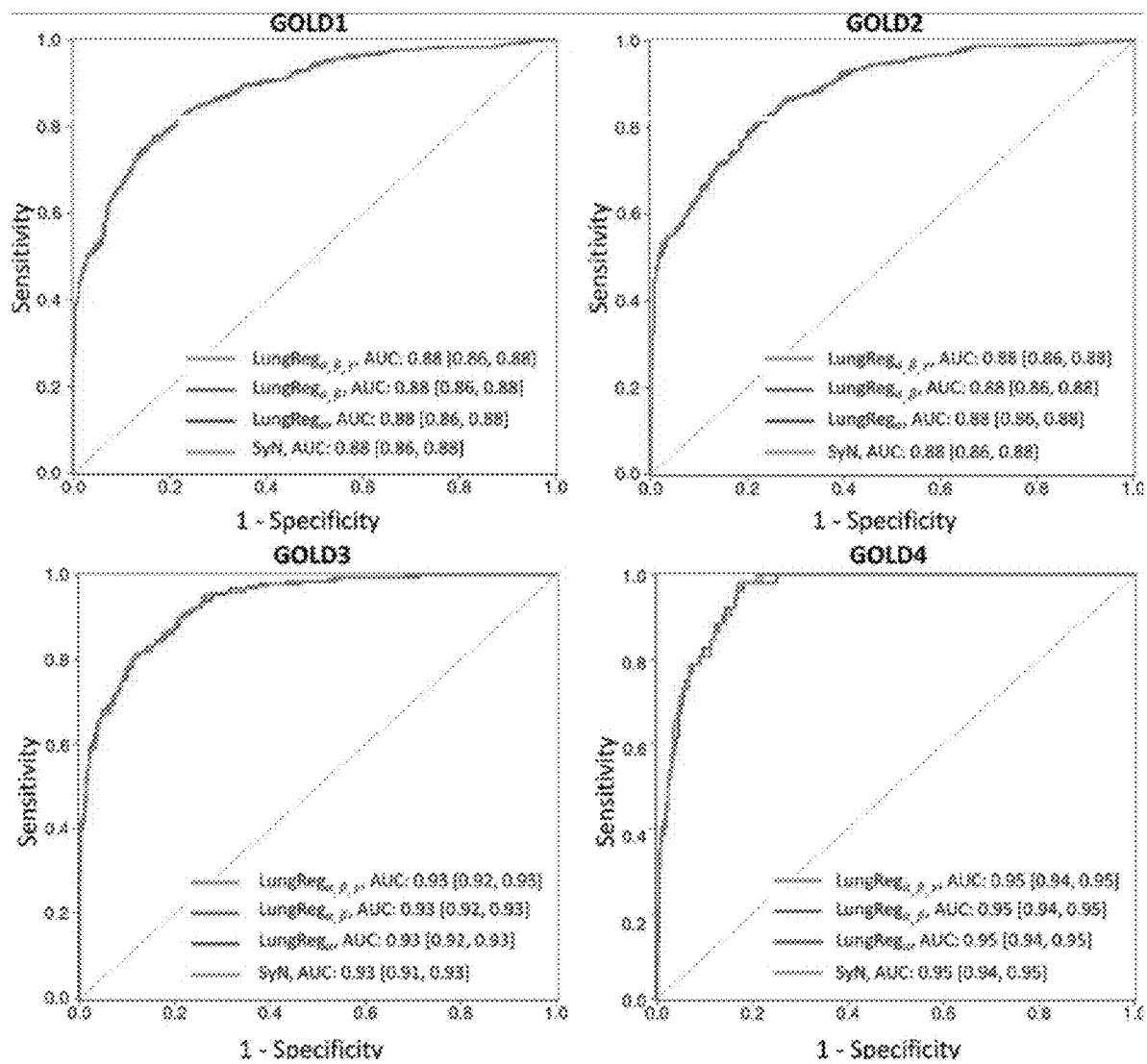
FIG. 6 shows ROC curves and AUCs for each lung deformable registration algorithm for predicting GOLD stages using % EM-LAA and % AT-ADM as predictors.

Intraclass correlation coefficients (ICCs) between each LungReg algorithm and SyN are listed in Table 5 below, indicating strong agreement (ICCs: 0.98-0.99) between LungReg and SyN air trapping measurements for each lung structure. Air trapping measurements appear robust to the inclusion of the segmentation and Jacobian loss functions. FIG. 6 provides receiver operating characteristic (ROC) curves and area under the receiver operating characteristic curves (AUCs) for each lung deformable registration algorithm for predicting Global Initiative for Chronic Obstructive Lung Disease (GOLD) stages with use of percentage emphysema low attenuation area, or % EM-LAA, and percentage air trapping-attenuation difference map, or % AT-ADM, as predictors. Algorithms showed near-identical performance for each respective GOLD stage (1-4). Areas under the receiver operating characteristic curves for the algorithm for performing deformable registration of lung CT (LungReg) were not significantly different from those for symmetric diffeomorphic registration (iterative) (SyN), which suggests that LungReg air trapping measurements could supplant SyN air trapping measurements.

TABLE 5

| Structure | LungReg$_\alpha$ | LungReg$_{\alpha,\beta}$ | LungReg$_{\alpha,\beta,\gamma}$ |
|---|---|---|---|
| Whole | 0.99 [0.99, 0.99] | 0.98 [0.98, 0.99] | 0.98 [0.98, 0.99] |
| LLL | 0.98 [0.98, 0.99] | 0.98 [0.98, 0.98] | 0.98 [0.98, 0.98] |
| LUL | 0.98 [0.98, 0.98] | 0.98 [0.98, 0.98] | 0.98 [0.98, 0.98] |
| RLL | 0.99 [0.99, 0.99] | 0.98 [0.98, 0.99] | 0.99 [0.98, 0.99] |
| RML | 0.99 [0.98, 0.99] | 0.98 [0.98, 0.98] | 0.98 [0.98, 0.99] |
| RUL | 0.99 [0.99, 0.99] | 0.99 [0.98, 0.99] | 0.99 [0.98, 0.99] |

The inventive U-Net inspired CNN disclosed herein performs deformable registration across the inspiratory and expiratory phases of the respiratory cycle to enable quantification of lobar air trapping. A hybrid loss function that incorporates lobar segmentation overlap and the Jacobian determinant improves algorithm performance, achieving an important goal of reducing inference runtime from as much as ~15 minutes to ~2.25 seconds on CPU and ~1 second on GPU, without loss of accuracy. The final model, LungReg$_{\alpha,\beta,\gamma}$, achieved greater overlap of lung structures and comparable spatial accuracy to the iterative SyN algorithm, while generating displacement fields with fewer regions of nonanatomic non-invertibility ("folding" voxels). Further, when we applied LungReg$_{\alpha,\beta,\gamma}$ to CTs from phase 1 of the COPDGene study, the algorithm exhibited similar ability to predict spirometric GOLD stage, which requires voxel-wise registration of inspiratory and expiratory phase images.

The accuracy of the inventive algorithm is partially attributed to the incorporation of the lobar segmentation loss in the hybrid loss function. The addition of a segmentation loss encourages lobar overlap during training, thereby improving colocalization of lung structures at the lobar boundaries. As a result, we observed improved lobar overlap, particularly for the right middle lobe. This is particularly important for computing regional lung characteristics, such as air trapping, at the lobar level.

Since the lung lobes span large territories, deformations within the lobes can be relatively unconstrained and subject to areas of voxel "folding" (i.e., areas of physically unrealistic and noninvertible transformations measured by the percentage of nonpositive Jacobian determinants). To enforce transformation invertibility (i.e., to reduce voxel "folding"), some CNN deformable registration algorithms explicitly restrict transformations to be diffeomorphic. In contrast, the inventive approach uses a strategy that incorporates the Jacobian as an additional loss component, providing improved landmark colocalization error while maintaining lobar overlap and reduced "folding" voxels to 0.04%, outperforming the diffeomorphic SyN algorithm. Overall, LungReg's performance, measured by Dice overlap (0.95), voxel "folding" (0.04%), landmark colocalization error (7.21 mm), and runtime (~ 1 second) was comparable to other methods reported in the literature, reporting 92%-93% Dice, 0.02 to 2.1% for voxel "folding", 1.39 to 7.98 landmark colocalization error, and 0.2-2 seconds runtime. The inventive approach expands on prior efforts, recognizing the need to address multiple endpoints for deformable registration, and ultimately confirms the utility of CNN-based deformable registration to quantify air trapping and stratify patients from the COPDGene study.

It may be noted that due to long training times, LungReg hyperparameters were optimized successively (as described above). Alternative CNN architectures were not thoroughly explored for segmentation and registration, however, it will be apparent to those of skill in that art that other CNN architectures may be used. Efficient joint hyperparameter optimization may provide further benefit as may additional/ alternative CNN architectures in the context of lung measurements. In addition, segmentation overlap following deformable registration was calculated using lobar segmentations inferred by a previously developed lung segmentation CNN, rather than manually hand-drawn 3D segmentations. Manual 3D segmentation of 1,000 series pairs would not be feasible such that the tradeoff of the high volume of test data outweighed the potential benefits of a ground truth defined by manual segmentation. Since the test data included data solely from the COPDGene study, which used a standardized imaging protocol, it may not reflect the variability of scans collected using clinical imaging acquisition protocols.

The inventive CNN-based deformable lung registration algorithm disclosed herein accurately quantifies air trapping measurements in a broad cohort of patients with a wide range of pulmonary air trapping, reduces inference runtime, improves lobar overlap, and reduces voxel "folding." Fast, fully-automated CNN-based lung deformable registration algorithms can facilitate translation of these measurements into clinical practice, potentially improving the diagnosis and severity assessment of small airway diseases.

The invention claimed is:

1. A method for automated deformable registration of an organ from images, the method comprising:
   receiving in a computer processor configured for executing a trained convolutional neural network (CNN) image data to comprising computed tomography (CT) series pairs comprising a first series of images of the organ in a first state and a second series of images of the organ in at least one second state;
   propagating the first and second series of images of the organ using a first trained CNN to generate segmentations of the organ;
   propagating the first and second series of images and the segmentations of the organ using a second trained CNN to deformably register the second series of images to the first series of images, wherein the second trained CNN is trained to predict a displacement field by minimizing a registration loss function, wherein the displacement field is configured to maximize colocalization of the organ between the first state and the at least one second state; and
   generating an output comprising a deformed image corresponding to the at least one second state;
   wherein the organ comprises one or more lung, the first state is inspiratory and the at least one second state is expiratory, and the CT series pairs comprise volumetric lung CT scans.

2. The method of claim 1, wherein the registration loss function is a combination of one or more loss function selected from the group consisting of cross-correlation loss, displacement field loss, Dice loss, and Jacobian loss.

3. The method of claim 1, wherein the image data comprises voxels.

4. The method of claim 3, wherein the first and second trained CNNs are 3D U-Net CNNs.

5. The method of claim 1, further comprising extracting lung measurements from the segmentations.

6. The method of claim 1, further comprising generating a disease map from a visual comparison of the first series of images and the deformed image.

7. The method of claim 1, further comprising pre-processing the image data by one or more of resizing to a standard resolution, scaling voxel attenuations, and affine-registering the second series to the first series.

8. A system for automated deformable registration of an organ from medical images, comprising:
   at least one computer processor configured to:
   acquire image data comprising computed tomography (CT) series pairs comprising a first series of images of the organ in a first state and a second series of images of the organ in at least one second state;
   execute a first convolutional neural network (CNN), wherein the first CNN trained to generate segmentations of the organ using the first and second series of images;
   execute a second CNN, wherein the second CNN is trained to deformably register the second series of images to the first series of images using the first and second series of images and the segmentations of the organ, wherein the second CNN is further configured to predict a displacement field by minimizing a registration loss function, wherein the displacement field is configured to maximize colocalization of the organ between the first state and the at least one second state; and
   generate an output comprising a deformed image corresponding to the at least one second state;
   wherein the organ comprises one or more lung, the first state is inspiratory and the at least one second state is expiratory, and the CT series pairs comprise volumetric lung CT scans.

9. The system of claim 8, wherein the registration loss function is a combination of one or more loss function selected from the group consisting of cross-correlation loss, displacement field loss, Dice loss, and Jacobian loss.

10. The system of claim 9, wherein the image data comprises voxels.

11. The system of claim 9, wherein the first and second CNNs are 3D U-Net CNNs.

12. The system of claim 8, wherein the at least one computer processor is further configured for extracting lung measurements from the segmentations.

13. The system of claim 8, wherein the at least one computer processor is further configured for generating a disease map from a visual comparison of the first series of images and the deformed image.

14. The system of claim 8, wherein the at least one computer processor is further configured for pre-processing the image data by one or more of resizing to a standard resolution, scaling voxel attenuations, and affine-registering the second series to the first series.

* * * * *